(12) United States Patent
Yamashita (10) Patent No.: US 8,646,832 B2
(45) Date of Patent: Feb. 11, 2014

(54) FRONT STRUCTURE FOR VEHICLE

(71) Applicant: Taichi Yamashita, Toyota (JP)

(72) Inventor: Taichi Yamashita, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/649,440

(22) Filed: Oct. 11, 2012

(65) Prior Publication Data

US 2013/0106141 A1    May 2, 2013

(30) Foreign Application Priority Data

Oct. 27, 2011   (JP) .................................. 2011-236464

(51) Int. Cl.
   *B62D 25/08*         (2006.01)
(52) U.S. Cl.
   USPC .................. 296/203.02; 296/192; 296/193.09
(58) Field of Classification Search
   USPC .................... 296/203.01, 203.02, 193.09, 192
   See application file for complete search history.

(56) References Cited

U.S. PATENT DOCUMENTS 2,022,209 A * 11/1935 Lawyer .................... 362/296.01

FOREIGN PATENT DOCUMENTS

| JP | 7-323737 | 12/1995 |
| JP | 2007-118796 | 5/2007 |
| JP | 2011-20624 | 2/2011 |
| JP | 2011-162108 | 8/2011 |
| WO | WO 2010/137149 A1 | 12/2010 |

\* cited by examiner

*Primary Examiner* — Dennis Pedder
(74) *Attorney, Agent, or Firm* — Oblon, Spivak, McClelland, Maier & Neustadt, L.L.P.

(57) ABSTRACT

A lower wall portion of a bracket is attached to a motor compartment cross member via a charger. The bracket has an L-shaped cross-sectional configuration when viewed from a side of the vehicle, and includes a vertical wall portion which is bent from a vehicle-rear side end of the lower wall portion and extends toward the top of the vehicle. A DC/DC converter is attached to an upper portion of the vertical wall portion of the bracket. The DC/DC converter is located in such a position that an upper portion of the DC/DC converter overlaps with a cowling when viewed from a front of the vehicle.

8 Claims, 4 Drawing Sheets

FRONT STRUCTURE FOR VEHICLE

INCORPORATION BY REFERENCE

The disclosure of Japanese Patent Application No. 2011-236464 filed on Oct. 27, 2011 including the specification, drawings and abstract is incorporated herein by reference in its entirety.

BACKGROUND OF THE INVENTION

1. Field of the Invention

The present invention relates to a front structure for a vehicle.

2. Description of Related Art

A front structure for a vehicle is known in which a high-voltage unit that includes an electric component, such as an inverter or converter, is located in a motor room (refer to Japanese Patent Application Publication No. 2011-020624 (JP 2011-020624 A), for example).

In such a structure, when the electric component, for example, is located in such a position as to overlap with a member, such as a cowling, which is located on the vehicle-rear side thereof when viewed from a front of the vehicle, the member, such as a cowling, may interfere with the electric component from the vehicle-rear side when the vehicle has a frontal collision.

SUMMARY OF THE INVENTION

The present invention provides a front structure for a vehicle which can prevent an electric component from being damaged or reduce the risk of the electric component being damaged when the vehicle has a frontal collision.

A front structure for a vehicle according to a first aspect of the present invention includes an extension portion which is attached to an upper portion of a dash panel that partitions a vehicle interior and a vehicle front space which is located in front of the vehicle interior, the extension portion extending from the dash panel toward the front of the vehicle; an electric component which is located in such a position in the vehicle front space that at least a portion of the electric component overlaps with the extension portion when viewed from a front of the vehicle; and a bracket which is located in the vehicle front space and has an L-shaped cross-sectional configuration when viewed form a side of the vehicle and which includes a lower wall portion that is attached to a vehicle body side member, and a vertical wall portion that is bent from one end of the lower wall portion in a vehicle longitudinal direction and extends toward the top of the vehicle, wherein the electric component is attached to an upper portion of the vertical wall portion.

According to the front structure for a vehicle of the first aspect of the present invention, the electric component, which is attached to the upper portion of the bracket, is located in such a position in the vehicle front space that at least the portion of the electric component overlaps with the extension member which is attached to the upper portion of the dash panel when viewed from a front of the vehicle. Thus, when the vehicle has a frontal collision and the bracket is moved rearward toward the dash panel, the electric component approaches the extension member unless the bracket is deformed.

The bracket has an L-shaped cross-sectional configuration when viewed from a side of the vehicle, and includes a lower wall portion that is attached to the vehicle body side member, and the vertical wall portion that is bent from one end of the lower wall portion in a vehicle longitudinal direction and extends toward the top of the vehicle and that has the upper portion to which the electric component is attached. Therefore, when the vehicle has a frontal collision, the bracket is deformed in such a manner that the upper end side of the vertical wall portion as a free end side is tilted toward the front of the vehicle from the bending portion between the vertical wall portion and the lower wall portion by an inertia force which acts on the electric component toward the front of the vehicle. Thus, basically, the interference between the extension member and the electric component is avoided. Even when the extension member interferes with the electric component, the vertical wall portion is tilted to reduce the impact that is transmitted from the extension member to the electric component.

In the front structure for a vehicle according to the first aspect of the present invention, the electric component may be a first in-vehicle component and a second in-vehicle component may be located on the vehicle-front side of the first in-vehicle component, away from the first in-vehicle component, and in such a position as to overlap with a lower portion of the first in-vehicle component when viewed from a front of the vehicle.

According to the front structure for a vehicle of the first aspect of the present invention, the second in-vehicle component is located on the vehicle-front side of the first in-vehicle component, away from the first in-vehicle component, and the second in-vehicle component is located in such a position as to overlap with the lower portion of the first in-vehicle component when viewed from a front of the vehicle. Thus, even when the distance between the second in-vehicle component and the first in-vehicle component in the vehicle longitudinal direction is short, the first in-vehicle component does not interfere with the second in-vehicle component unless the vertical wall portion of the bracket is tilted by a predetermined amount when the vehicle has a frontal collision. The reason for it is that the second in-vehicle component is located away from the first in-vehicle component, even when the second in-vehicle component is located in such a position as to overlap with the lower portion of the first in-vehicle component when viewed from a front of the vehicle.

In the front structure for a vehicle according to the first aspect of the present invention, the second in-vehicle component may be attached to the lower wall portion of the bracket.

According to the front structure for a vehicle of the first aspect of the present invention, the first in-vehicle component and the second in-vehicle component are both attached to the bracket so that they can be handled easily as a unit. In addition, because the first in-vehicle component and the second in-vehicle component are both attached to the bracket, the installation space for the first in-vehicle component and the second in-vehicle component is limited in the vehicle longitudinal direction to save space. On the other hand, while the installation space for the first in-vehicle component and the second in-vehicle component is limited (narrow) in the vehicle longitudinal direction, the first in-vehicle component does not interfere with the second in-vehicle component unless the vertical wall portion of the bracket is tilted by a predetermined amount when the vehicle has a frontal collision.

The front structure for a vehicle according to the first aspect of the present invention may further include a support member which supports the bracket and extends in a vehicle longitudinal direction.

In the front structure for a vehicle according to the first aspect of the present invention, the support member may include, at a vehicle-front side part thereof, a closed cross-sectional portion which is located on the vehicle-front side of the electric component and extends in a vehicle width direction.

According to the front structure for a vehicle of the first aspect of the present invention, because the support member which supports the bracket extends in a vehicle longitudinal direction and has, at the vehicle-front side part thereof, the closed cross-sectional portion which extends in a vehicle width direction, the vehicle-front side part of the support member is prevented from being deformed when the vehicle has a frontal collision. In addition, the cross-sectional portion, which is formed at the vehicle-front side part of the support member, is located on the vehicle-front side of the electric component. This prevents members that are located on the vehicle-front side of the support member from interfering with the electric component or reduces the risk of the members interfering with the electric component.

The front structure for a vehicle according to the first aspect of the present invention may further include an electrical unit which includes the electric component and the bracket, and the closed-cross-sectional portion may have a vehicle-front side end which is located on the vehicle-front side of the electrical unit.

According to the front structure for a vehicle of the first aspect of the present invention, the closed-cross-sectional portion of the support member has the vehicle-front side end which is located on the vehicle-front side of the electrical unit, which includes the electric component and the bracket. This prevents members that are located on the vehicle-front side of the support member from interfering with the electric unit or reduces the risk of the members interfering with the electric unit when the vehicle has a frontal collision.

In the front structure for a vehicle according to the first aspect of the present invention, the electric component may be attached to a vehicle-front side surface of the vertical wall portion.

According to the front structure for a vehicle of the first aspect of the present invention, because the electric component is attached to the vehicle-front side surface of the vertical wall portion of the bracket, the electric component is located, with respect to the vertical wall portion, on the side toward which the vertical wall portion is tilted when the vehicle has a frontal collision. Thus, when the vehicle has a frontal collision, the electric component functions effectively as an inertial mass and the vertical wall portion of the bracket is displaced easily.

A front structure for a vehicle according to a second aspect of the present invention includes an extension portion which is attached to an upper portion of a dash panel that partitions a vehicle interior and a vehicle front space which is located in front of the vehicle interior, the extension portion extending from the dash panel toward the front of the vehicle; an electric component which is located in such a position in the vehicle front space that at least a portion of the electric component overlaps with the extension portion when viewed from a front of the vehicle; and a bracket which includes a lower wall portion that extends in a vehicle longitudinal direction and attached to a vehicle body side member, and a vertical wall portion that extends toward the top of the vehicle from the lower wall portion, wherein the electric component is attached to an upper portion of the vertical wall portion.

As described in the foregoing, the front structure for a vehicle according to this embodiment can prevent the electric component from being damaged or reduce the risk of the electric component being damaged when the vehicle has a frontal collision.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Description is hereinafter made of a front structure for a vehicle according to one embodiment of the present invention with reference to FIG. 1 to FIG. 3. Note that the arrows FR and UP which are shown in these drawings as needed indicate the front side and the upper side, respectively, of the vehicle. The arrow W indicates the vehicle width direction. As the vehicle of this embodiment, an electrical vehicle (or hybrid electrical vehicle) is applied.

Figure 1:
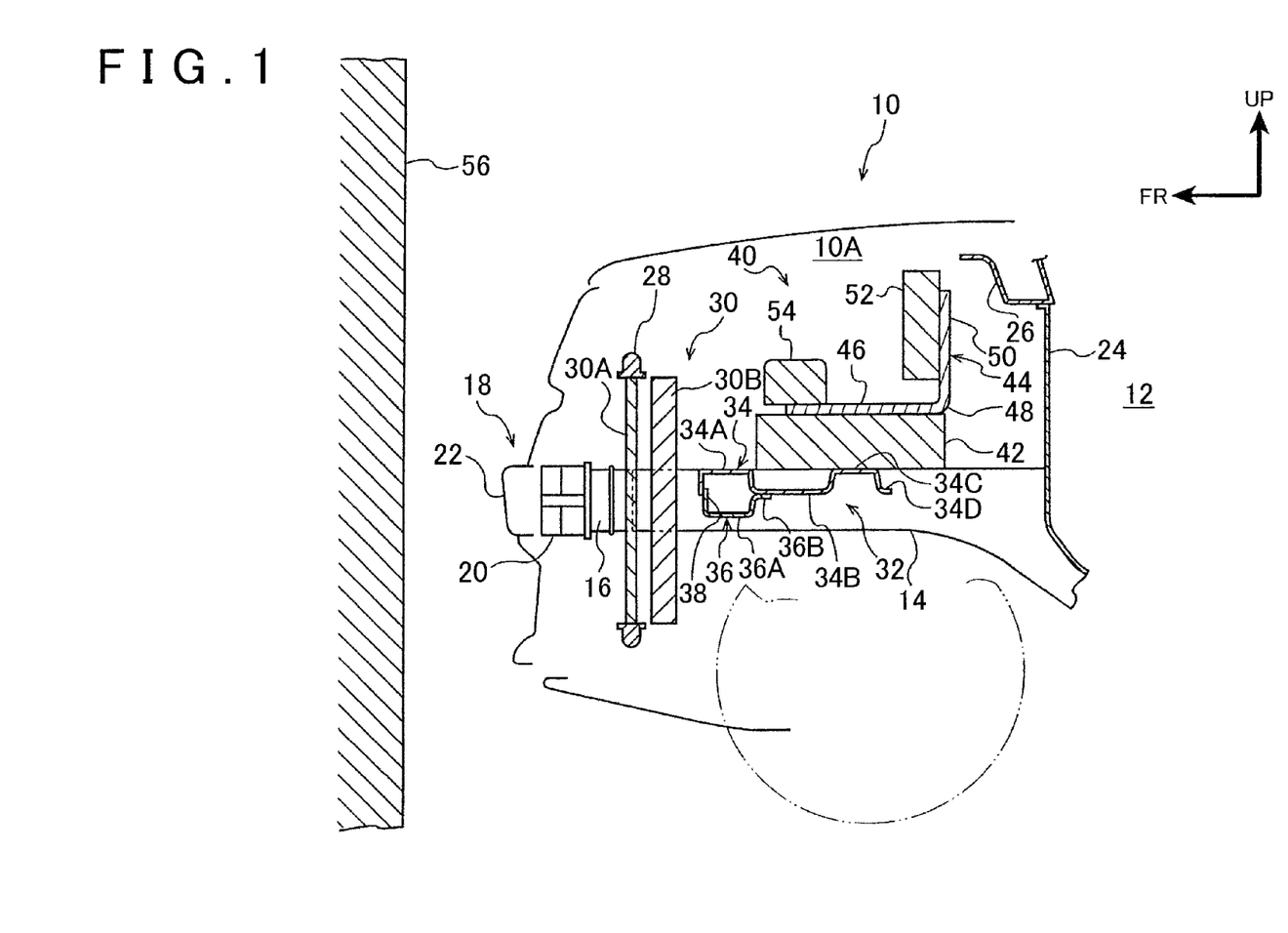
FIG. 1 is a sectional side elevation that illustrates a front structure for a vehicle according to one embodiment of the present invention.

FIG. 1 shows a sectional side elevation of a front structure for a vehicle according to this embodiment. Note that FIG. 1 is a cross-sectional view, viewed from a side of the vehicle, of a front part of the vehicle which is taken across almost the center thereof in the vehicle width direction. FIG. 2 shows a schematic plan view of the front structure for a vehicle.

As shown in the drawings, a motor compartment (which is also referred to as "motor room") 10A as a vehicle front space in which a motor (not shown, electric motor) that is equipped as a power source and so on are housed is formed in a vehicle front part 10. In addition, a pair of right and left front side members 14 is disposed on both sides of the motor compartment 10A in the vehicle width direction with their longitudinal direction extending in the vehicle longitudinal direction. The front side members 14 are framework members of the vehicle body and have a closed cross-sectional structure. As shown in FIG. 2, a crush box 16 with a rectangular cylindrical configuration is coaxially joined to a front end of each front side member 14. The crush boxes 16 are configured to be plastically compressed to absorb energy when subjected to an axial load.

Each of the right and left crush boxes 16 has a front end which is joined to a front bumper reinforcement 20. The front bumper reinforcement 20 is disposed at a front end of the vehicle with its longitudinal direction extending generally in the vehicle width direction. The front bumper reinforcement 20 has a curved configuration with its center portion bulging toward the front of the vehicle as seen in a plan view. The front bumper reinforcement 20 is a member which forms the framework of a front bumper 18. The front bumper reinforcement 20 has a closed cross-sectional structure. The front bumper 18 includes the front bumper reinforcement 20 and a front bumper cover 22 which has a design face.

As shown in FIG. 1, each of the front side members 14 has a rear end which is joined to a dash panel (cabin front wall) 24. The dash panel 24 partitions a cabin 12 as a vehicle interior and the motor compartment 10A, which is located in front of the cabin 12. The dash panel 24 has an upper end which is joined to a cowling 26 as an extension member. The cowling 26 has a gutter-like configuration, and extends from the upper end of the dash panel 24 toward the front of the vehicle. The cowling 26 also extends generally in a vehicle width direction along a lower edge of a front windshield glass (not shown) and connects right and left front pillars (not shown). The cowling 26 has a function of separating water from air which is introduced into the cabin 12. A wiper mechanism (not shown) is housed in the cross-section of the cowling 26. While the cowling 26 is constituted of a plurality of panels, it is shown in a simplified manner as if it is constituted of one panel in the drawings. The shape of the cowling 26 itself is also shown in a simplified manner.

In the motor compartment 10A, which is located on the vehicle-front side of the dash panel 24, a radiator support 28 which constitutes the framework members of the vehicle body is located inside the right and left crush boxes 16 in the vehicle width direction. The radiator support 28 has a generally rectangular configuration when viewed from a front of the vehicle. Cooling system components 30A are disposed within the frames of the radiator support 28. The cooling system components 30A are for a heat exchanger which constitutes a part of a cooling unit 30 (cooling module). A radiator and a capacitor are integrated together. A fan 30B which constitutes a part of the cooling unit 30 is adjacently disposed on the vehicle-rear side of the cooling system component 30A and attached to the vehicle body.

Figure 2:
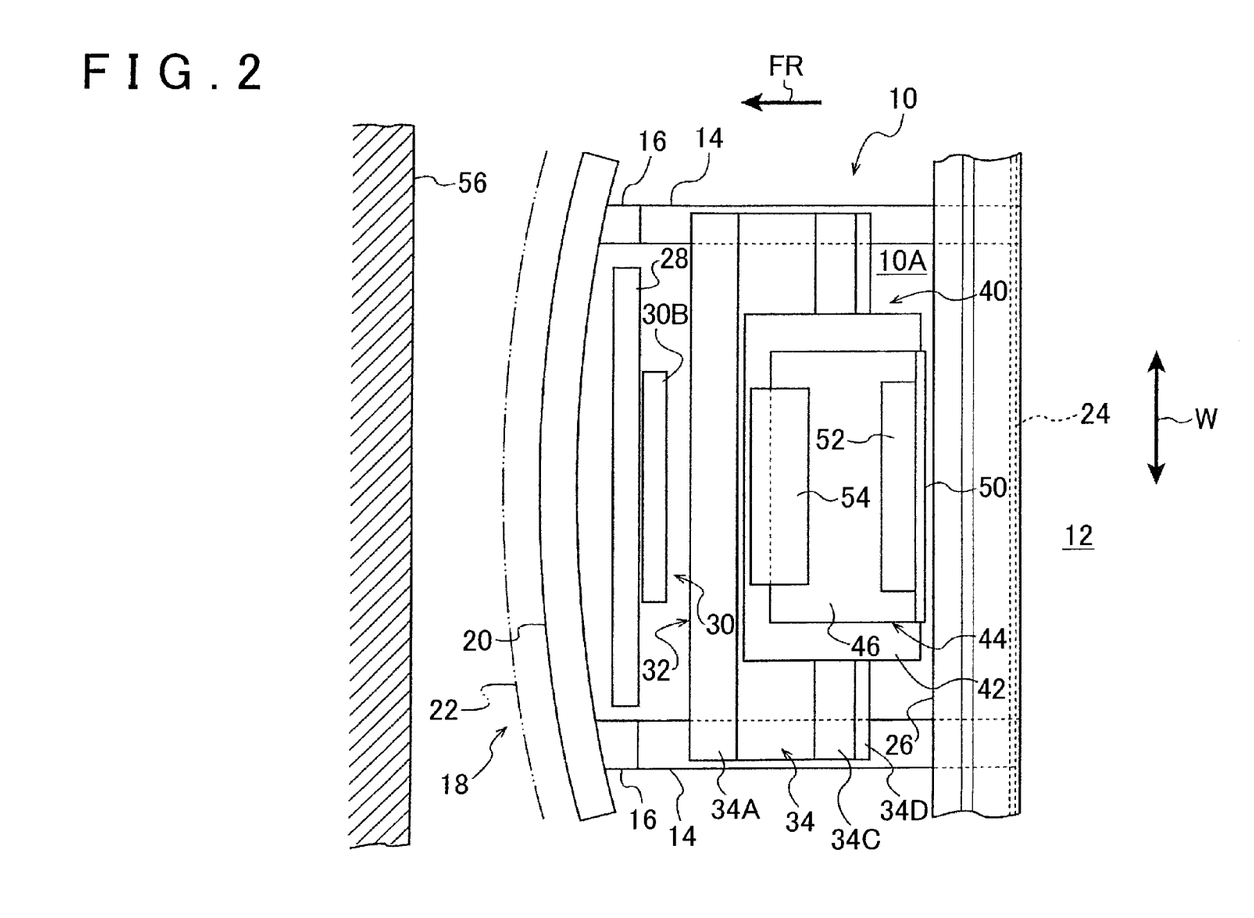
FIG. 2 is a schematic plan view that illustrates the front structure for a vehicle according to one embodiment of the present invention.

As shown in FIG. 2, a motor compartment cross member 32 (which is hereinafter referred to simply as "cross member 32") as a support member which extends in the vehicle width direction between longitudinal intermediate portions of the right and left front side members 14 is disposed on the vehicle-rear side of the fan 30B. Both ends of the cross member 32 in the vehicle width direction are joined to the front side members 14 by means of bolts (or by welding), for example. As shown in FIG. 1, the cross member 32 extends in the vehicle longitudinal direction, and includes a motor compartment cross member upper 34 (which is hereinafter referred to simply as "cross member upper 34") which forms an upper part thereof and a motor compartment cross member lower 36 (which is hereinafter referred to simply as "cross member lower 36") which forms a lower part thereof.

The cross member upper 34 has a rectangular wave-like vertical cross-sectional configuration when viewed from a side of the vehicle. In other words, the cross member upper 34 has a first raised portion 34A and a second raised portion 34C which both protrude toward the top of the vehicle at front and rear parts, respectively, thereof. The cross member upper 34 also has a flat portion 34B which connects a lower rear end of the first raised portion 34A and a lower front end of the second raised portion 34C. In addition, the cross member upper 34 has a rear end portion 34D which extends from a lower rear end of the second raised portion 34C toward the rear of the vehicle.

In contrast, the cross member lower 36 has a recessed portion 36A which is located on the vehicle-bottom side of the first raised portion 34A of the cross member upper 34. The recessed portion 36A opens toward the top of the vehicle and protrudes toward the bottom of the vehicle. The front surface of an upper front portion of the recessed portion 36A is joined by welding to the rear surface of a lower front portion of the first raised portion 34A of the cross member upper 34. The cross member lower 36 also has a flange portion 36B which is bent from an upper rear end of the recessed portion 36A and extends toward the rear of the vehicle. The flange portion 36B is located on the vehicle-bottom side of a front end portion of the flat portion 34B of the cross member upper 34. The upper surface of the flange portion 36B of the cross member lower 36 is joined by welding to the lower surface of a front end portion of the flat portion 34B of the cross member upper 34.

In this way, a closed cross-sectional portion 38 is formed by the cross member upper 34 and the cross member lower 36 at a vehicle-front side part (front end) of the cross member 32. The closed cross-sectional portion 38 extends in the vehicle width direction.

A high-voltage unit 40 as an electrical unit is located on the vehicle-top side of the second raised portion 34C of the cross member 32. In the motor compartment 10A, the high-voltage unit 40 is located on the vehicle-rear side of the vehicle-front side end of the closed cross-sectional portion 38 of the cross member 32 in the vehicle longitudinal direction. The high-voltage unit 40 includes a charger 42, a bracket 44, a DC/DC converter 52, which is an electric component as a first in-vehicle component, and a PTC (Positive Temperature Coefficient) heater 54 as a second in-vehicle component. The charger 42, the DC/DC converter 52 and the PTC heater 54 are elements as auxiliary machines (electric power devices).

The charger 42, which is a device which is used to charge a battery that drives the vehicle, is located at the center in the vehicle width direction on the cross member 32 and has a generally rectangular solid configuration. The charger 42 has a housing which forms the external shell thereof. A fixing flange portion (not shown) which extends horizontally from the housing is secured to top wall portions of the first raised portion 34A and the second raised portion 34C by means of bolts.

The bracket 44 is secured to an upper surface of the charger 42. The bracket 44 is a mount bracket which has an L-shaped cross-sectional configuration when viewed from a side of the vehicle. The bracket 44 is configured to be deformed more easily when its upper portion is subjected to a load in the vehicle longitudinal direction (than in the vehicle width direction or in the vehicle height direction). The bracket 44 has sufficient strength and rigidity against a load in the vehicle width direction or vehicle height direction and also has sufficient strength and rigidity against a load in the vehicle longitudinal direction which is applied thereto when the vehicle is accelerated or decelerated during a normal travel.

The bracket 44 has a lower wall portion 46 which is secured to an upper surface of the charger 42. In other words, the lower wall portion 46 is attached to the cross member 32 as a vehicle body side member via the charger 42. The bracket 44 is therefore supported by the cross member 32. The bracket 44 also has a vertical wall portion 50 which is bent from a vehicle-rear side end (one end in the vehicle longitudinal direction) of the lower wall portion 46 (the bending portion is designated by reference numeral 48) and extends toward the top of the vehicle. The bracket 44 is located in such a position that an upper portion of the vertical wall portion 50 overlaps with the cowling 26 when viewed from a front of the vehicle.

The DC/DC converter 52 is attached to a front surface (vehicle-front side surface) of an upper portion of the vertical wall portion 50 of the bracket 44. In other words, the DC/DC converter 52 is disposed at a location away from the bending portion 48 on the vertical wall portion 50 of the bracket 44 with its center of gravity located on the vehicle-front side of the vertical wall portion 50. The DC/DC converter 52 is an electric power converter (high-voltage component) which converts the voltage from a DC power source. The DC/DC converter 52 is located in such a position that an upper portion thereof overlaps with the cowling 26 when viewed from a front of the vehicle. In addition, the DC/DC converter 52 is located on the vehicle-rear side of the closed cross-sectional portion 38 of the cross member 32 in the vehicle longitudinal direction.

The PTC heater 54 is attached to an upper surface of a front end portion of the lower wall portion 46 of the bracket 44. The PTC heater 54 is disposed away from the DC/DC converter 52 on the vehicle-front side of the DC/DC converter 52, and is located in such a position as to overlap with a lower portion of the DC/DC converter 52 when viewed from a front of the vehicle. No in-vehicle member is disposed between the PTC heater 54 and the DC/DC converter 52.

The functions and effects of the above embodiment are next described.

As shown in FIG. 1 and FIG. 2, the DC/DC converter 52, which is attached to an upper portion of the bracket 44, is located in such position as to overlap partially with the cowling 26, which is attached to an upper portion of the dash panel 24, when viewed from a front of the vehicle before the vehicle front part 10 has a frontal collision.

Figure 3:
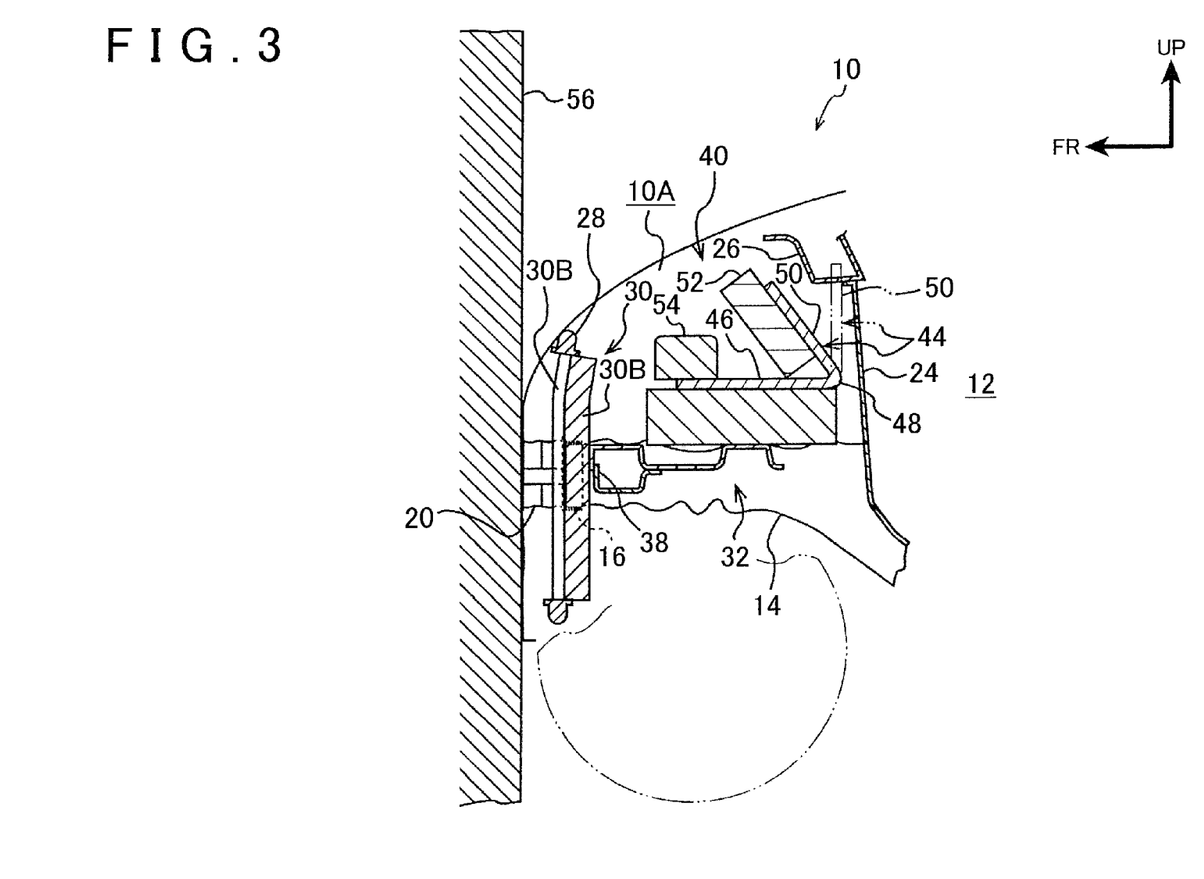
FIG. 3 is a schematic sectional side elevation that illustrates the function which the front structure for a vehicle according to one embodiment of the present invention fulfills when the vehicle has a frontal collision.

When the vehicle front part 10 has a frontal collision with a barrier (collision object) 56 from the above state as shown in FIG. 3, the collision load is transmitted from the front bumper reinforcement 20 via the crush boxes 16 to the front side members 14. Thus, the crush boxes 16 are axially compressed and plastically deformed. In addition, front portions of the front side members 14 are axially compressed and plastically deformed to absorb the collision energy. During this process, the barrier 56 presses the front side members 14 toward the dash panel 24. In addition, the barrier 56 presses the cross member 32 toward the dash panel 24 via the cooling unit 30 and so on. Thus, the bracket 44 is moved rearward toward the dash panel 24. As a result, the DC/DC converter 52, which is located opposed to the dash panel 24, approaches the cowling 26 unless the bracket 44 is deformed.

As shown in FIG. 1, the bracket 44 has an L-shaped cross-sectional configuration when viewed from a side of the vehicle. The lower wall portion 46 of the bracket 44 is attached to the cross member 32 as a vehicle body side member via the charger 42. In addition, the vertical wall portion 50 of the bracket 44, which has an upper portion to which the DC/DC converter 52 is attached, is bent from the vehicle-rear side end of the lower wall portion 46 and extends toward the top of the vehicle. Thus, when the vehicle has a frontal collision, the bracket 44 is brought into a state as shown in FIG. 3. Specifically, the bracket 44 is deformed in such a deformation mode that the upper end side of the vertical wall portion 50 as a free end side is tilted toward the front of the vehicle from the bending portion 48 between the vertical wall portion 50 and the lower wall portion 46 by an inertia force which acts on the DC/DC converter 52 toward the front of the vehicle. In other words, the vertical wall portion 50 rotates about the bending portion 48 (which serves as an axis of rotation).

In this embodiment, the DC/DC converter 52 is attached to a vehicle-front side surface of the vertical wall portion 50 of the bracket 44 as shown in FIG. 1. Thus, the DC/DC converter 52 is located, with respect to the vertical wall portion 50, on the side toward which the vertical wall portion 50 is tilted when the vehicle has a frontal collision. Therefore, when the vehicle has a frontal collision, the DC/DC converter 52 functions effectively as an inertial mass. Thus, the vertical wall portion 50 of the bracket 44 is displaced easily in a tilting manner as shown in FIG. 3.

Thus, basically, the interference between the cowling 26 and the DC/DC converter 52 is avoided. Even when the cowling 26 interferes with the DC/DC converter 52 via an upper portion of the bracket 44, the vertical wall portion 50 is tilted to reduce the impact that is transmitted from the cowling 26 to the DC/DC converter 52.

In addition, the PTC heater 54 is attached to the lower wall portion 46 of the bracket 44 on the vehicle-front side of the DC/DC converter 52 as shown in FIG. 1. The PTC heater 54 is located away from the DC/DC converter 52. However, the DC/DC converter 52 and the PTC heater 54 are both attached to the bracket 44. Thus, the installation space for the DC/DC converter 52 and the PTC heater 54 is limited (narrow) in the vehicle longitudinal direction to save space. Thus, even when the distance between the PTC heater 54 and the DC/DC converter 52 in the vehicle longitudinal direction is short, the DC/DC converter 52 does not interfere with the PTC heater 54 unless the vertical wall portion 50 of the bracket 44 is tilted (strokes) by a predetermined amount (refer to FIG. 3) when the vehicle has a frontal collision. The reason for it is that the PTC heater 54 is located away from the DC/DC converter 52, even when the PTC heater 54 is located in such a position as to overlap with a lower portion of the DC/DC converter 52 when viewed from a front of the vehicle.

In addition, in the front structure for a vehicle according to this embodiment, the cross member 32, which supports the bracket 44, extends in the vehicle longitudinal direction. Moreover, the closed cross-sectional portion 38, which extends in the vehicle width direction, is formed at a vehicle-front side part of the cross member 32. Thus, when the vehicle has a frontal collision, the vehicle-front side part of the cross member 32 is prevented from being deformed. The closed cross-sectional portion 38, which is formed at a vehicle-front side part of the cross member 32, has a vehicle-front side end which is located on the vehicle-front side of the high-voltage unit 40, which includes the DC/DC converter 52. This prevents the cooling unit 30 and the radiator support 28, which are located on the vehicle-front side of the cross member 32, from interfering with the high-voltage unit 40 or reduces the risk of the cooling unit 30 and the radiator support 28 interfering with the high-voltage unit 40 as shown in FIG. 3. Incidentally, it is difficult to predict in what mode the peripheral devices of the high-voltage unit 40 (the cooling unit 30 and so on) are deformed when the vehicle has a frontal collision. In this embodiment, however, the possibility of the peripheral devices which are located on the vehicle-front side of the cross member 32 interfering with the high-voltage unit 40 is decreased by reducing the risk of deformation of the front end portion of the cross member 32.

As described above, the front structure for a vehicle according to this embodiment can prevent the DC/DC converter 52 from being damaged or reduce the risk of the DC/DC converter 52 being damaged when the vehicle has a frontal collision.

The DC/DC converter 52 and the PTC heater 54 are both attached to the bracket 44 so that they can be handled easily as a unit. This facilitates the assembly work in this embodiment.

While a case where the electric component is the DC/DC converter 52 is described as an example in the above embodiment, the electric component may be another electric component, such as an inverter.

In the above embodiment, the DC/DC converter 52 as the electric component is located in such a position that an upper portion of the DC/DC converter 52 overlaps with the cowling 26 as the extension member when viewed from a front of the vehicle. However, the electric component may be located in such a position as to overlap entirely with the extension member when viewed from a front of the vehicle.

While a case where the extension member is the cowling 26 is described as an example in the above embodiment, the extension member may be another extension member, such as a member which extends toward the front of the vehicle from a dash upper panel, which forms an upper part of the dash panel.

In the above embodiment, the bracket 44 is located in such a position that an upper portion of the vertical wall portion 50 overlaps with the cowling 26 when viewed from a front of the vehicle. However, the bracket 44 may not be located in such a position that an upper portion of the vertical wall portion 50 overlaps with the extension member when viewed from a front of the vehicle as long as the electric component is located in such position that at least a portion of the electric component overlaps with the extension member when viewed from a front of the vehicle.

In a modification of the above embodiment, the vertical wall portion may be bent from a vehicle-front side end (an end in the vehicle longitudinal direction) of the lower wall portion and extends toward the top of the vehicle. Also, the vertical wall portion may be located in such a position to which the electric component is attached.

In the above embodiment, the PTC heater 54 as the second in-vehicle component is located away from the DC/DC converter 52 as a first in-vehicle component (electric component) on the vehicle-front side of the DC/DC converter 52. In addition, the PTC heater 54 is located in such a position as to overlap with a lower portion of the DC/DC converter 52 when viewed from a front of the vehicle. However, the PTC heater 54 is not necessarily located in such a position.

In the above embodiment, the PTC heater 54 as the second in-vehicle component is attached to the lower wall portion 46 of the bracket 44. However, the PTC heater 54 (second in-vehicle component) may be attached to a member other than the bracket 44.

In the above embodiment, the closed cross-sectional portion 38, which extends in the vehicle width direction, is formed at a vehicle-front side part of the motor compartment cross member 32 as the support member. However, the closed cross-sectional portion 38 may not be necessarily provided.

In another modification of the above embodiment, a bracket 44 to which only the DC/DC converter 52 as the electric component is attached (and to which the PTC heater 54 is not attached) may be attached directly to the motor compartment cross member 32 as the support member, for example. Alternatively, the closed cross-sectional portion 38 of the motor compartment cross member 32 may be located below the lower wall portion 46 of the bracket 44 and on the vehicle-front side of the DC/DC converter 52.

In the above embodiment, the DC/DC converter 52 as the electric component is attached to a vehicle-front side surface of the vertical wall portion 50 of the bracket 44. However, the electric component may be attached to a vehicle-rear side surface of the vertical wall portion of the bracket.

In addition, the concept of "L-shaped" includes not only being bent at a right angle as in the above embodiment but also being bent at an angle which is slightly larger or smaller than a right angle. In other words, it includes a configuration which provides substantially the same function and effect as in the case of making a bent at a right angle and can be substantially regarded as "L-shaped."

Figure 4:
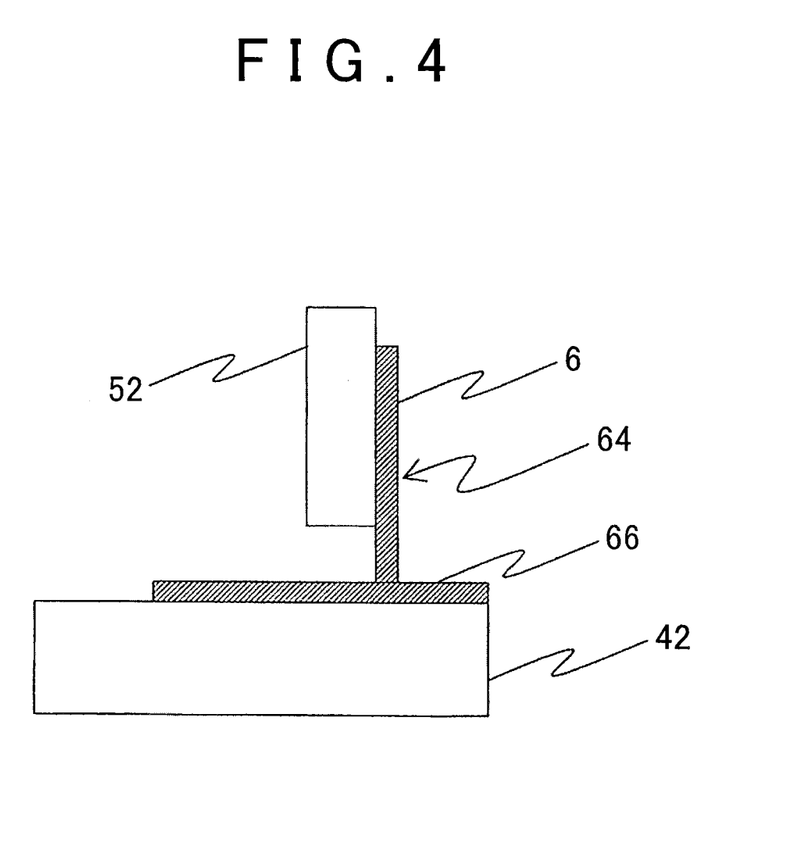
FIG. 4 is a sectional side elevation that illustrates the general configuration of a bracket according to another embodiment of the present invention.

In the above embodiment, the bracket 44 has an L-shaped configuration. However, the bracket may have a T-shaped vertical cross-sectional configuration when viewed from a side of the vehicle as shown in FIG. 4. In other words, a bracket 64 which has a lower wall portion 66 that extends in the vehicle longitudinal direction on the charger 42, and a vertical wall portion 60 that extends from the lower wall portion 66 toward the top of the vehicle may be provided.

In the above embodiment and the modifications thereof may be implemented in combination as needed.

While the disclosure has been explained in conjunction with specific exemplary embodiments thereof, it is evident that many alternatives, modifications, and variations will be apparent to those skilled in the art. Accordingly, exemplary embodiments of the disclosure as set forth herein are intended to be illustrative, not limiting. There are changes that may be made without departing from the scope of the disclosure.

What is claimed is:

1. A front structure for a vehicle, comprising:
an extension portion which is attached to an upper portion of a dash panel that partitions a vehicle interior and a vehicle front space which is located in front of the vehicle interior, the extension portion extending from the dash panel toward the front of the vehicle;
an electric component which is located in such a position in the vehicle front space that at least a portion of the electric component overlaps with the extension portion when viewed from a front of the vehicle; and
a bracket which is located in the vehicle front space, and has an L-shaped cross-sectional configuration when viewed from a side of the vehicle, and which includes a lower wall portion that is attached to a vehicle body side member, and a vertical wall portion that is bent from one end of the lower wall portion in a vehicle longitudinal direction and extends toward the top of the vehicle, wherein the electric component is attached to an upper portion of the vertical wall portion.

2. The front structure for a vehicle according to claim 1, wherein the electric component is a first in-vehicle component, and a second in-vehicle component is located on the vehicle-front side of the first in-vehicle component, away from the first in-vehicle component, and in such a position as to overlap with a lower portion of the first in-vehicle component when viewed from a front of the vehicle.

3. The front structure for a vehicle according to claim 2, wherein the second in-vehicle component is attached to the lower wall portion of the bracket.

4. The front structure for a vehicle according to claim 1, further comprising a support member which supports the bracket and extends in a vehicle longitudinal direction.

5. The front structure for a vehicle according to claim 4, the support member includes, at a vehicle-front side part thereof, a closed-cross-sectional portion which is located on the vehicle-front side of the electric component and extends in a vehicle width direction.

6. The front structure for a vehicle according to claim 5, further comprising an electrical unit which includes the electric component and the bracket, wherein the closed-cross-sectional portion has a vehicle-front side end which is located on the vehicle-front side of the electrical unit.

7. The front structure for a vehicle according to claim 1, wherein the electric component is attached to a vehicle-front side surface of the vertical wall portion.

8. A front structure for a vehicle, comprising:
an extension portion which is attached to an upper portion of a dash panel that partitions a vehicle interior and a vehicle front space which is located in front of the vehicle interior, the extension portion extending from the dash panel toward the front of the vehicle;
an electric component which is located in such a position in the vehicle front space that at least a portion of the electric component overlaps with the extension portion when viewed from a front of the vehicle; and
a bracket which includes a lower wall portion that extends in a vehicle longitudinal direction and attached to a vehicle body side member, and a vertical wall portion that extends toward the top of the vehicle from the lower wall portion, wherein the electric component is attached to an upper portion of the vertical wall portion.

* * * * *